(12) United States Patent
Fritz

(10) Patent No.: US 7,966,725 B2
(45) Date of Patent: Jun. 28, 2011

(54) FLAT GASKET AND PROCESS FOR THE PRODUCTION OF A FLAT GASKET

(75) Inventor: Wolfgang Fritz, Metzingen (DE)

(73) Assignee: ElringKlinger AG, Dettingen (DE)

( * ) Notice: Subject to any disclaimer, the term of this patent is extended or adjusted under 35 U.S.C. 154(b) by 253 days.

(21) Appl. No.: 12/221,133

(22) Filed: Jul. 30, 2008

(65) Prior Publication Data

US 2008/0289170 A1 Nov. 27, 2008

Related U.S. Application Data

(62) Division of application No. 11/232,545, filed on Sep. 22, 2005, now Pat. No. 7,422,218.

(30) Foreign Application Priority Data

Sep. 30, 2004 (DE) .......................... 10 2004 047540

(51) Int. Cl.
*F02F 11/00* (2006.01)

(52) U.S. Cl. ......... 29/888.3; 29/513; 277/591; 277/592; 277/595; 277/598

(58) Field of Classification Search ................. 29/888.3, 29/421.1, 505, 513, 509; 227/591–598
See application file for complete search history.

(56) References Cited

U.S. PATENT DOCUMENTS

| 4,739,999 | A | 4/1988 | Ishii et al. ...................... 277/595 |
| 6,209,883 | B1 | 4/2001 | Kashmerick et al. ......... 277/593 |
| 6,257,591 | B1 | 7/2001 | Abe et al. ...................... 277/591 |
| 6,357,758 | B1 * | 3/2002 | Zurfluh .......................... 277/595 |
| 6,951,338 | B2 | 10/2005 | Kestly ............................ 277/593 |
| 2003/0197334 | A1 * | 10/2003 | Werz et al. .................... 277/593 |

FOREIGN PATENT DOCUMENTS

| DE | 44 05 494 C1 | 4/1995 |
| DE | 195 31 232 A1 | 2/1997 |
| DE | 199 09 354 A1 | 9/1999 |
| DE | 100 53 556 A1 | 5/2002 |
| DE | 101 23 486 A1 | 11/2002 |
| DE | 102 13 900 A1 | 10/2003 |
| EP | 1 116 904 A2 | 7/2001 |
| EP | 1 197 689 A2 | 4/2002 |
| WO | WO 95/22706 | 8/1995 |

* cited by examiner

*Primary Examiner* — David P Bryant
*Assistant Examiner* — Christopher Besler

(57) ABSTRACT

In order to provide a flat gasket, in particular cylinder head gasket, comprising at least one metal gasket sheet made of a spring steel or a metallic material with a percentage elongation after fracture corresponding to the percentage elongation after fracture of a spring steel, which has a novel structure, it is proposed that the gasket sheet is provided with at least one edging fold, which comprises a bending region and a flange region connected in one piece to the gasket sheet via the bending region.

3 Claims, 8 Drawing Sheets

US 7,966,725 B2

FLAT GASKET AND PROCESS FOR THE PRODUCTION OF A FLAT GASKET

This application is a division of Ser. No. 11/232,545 filed Sep. 22, 2005 now U.S. Pat. No. 7,422,218.

The present disclosure relates to the subject matter that was disclosed in German Patent Application No. 10 2004 047 540.7 dated 30 Sep. 2004. The entire description of this earlier application is incorporated into the present description by reference.

FIELD OF THE DISCLOSURE

The present invention relates to a flat gasket, in particular cylinder head gasket, comprising at least one metal gasket sheet made of a spring steel or a metallic material with a percentage elongation after fracture corresponding to the percentage elongation after fracture of a spring steel.

BACKGROUND

Such flat gaskets are known from DE 195 13 361 C1, for example. This publication discloses a metal cylinder head gasket for an internal combustion engine, wherein the cylinder head gasket comprises at least one cover sheet made of spring steel, which is provided with beads running around the combustion chamber holes of the cylinder head gasket. When the gasket is in supported position, these beads ensure that the force of the bolts, with which the structural parts to be sealed and the gasket are held in position relative to one another, is concentrated into a linear pressure along the arch of the beads.

It is additionally known for protection of the sealing beads to provide a cylinder head gasket with a deformation restriction means (also termed "stopper"), through which the vertically deformable beads are protected against an impermissibly large deformation. Such a deformation restriction means at the same time constitutes a partial thickening of the cylinder head gasket, through which the engine components adjoining the cylinder head gasket are prestressed in such a way that the dynamic sealing gap vibration is reduced.

Such a deformation restriction means can be produced, for example, by welding an additional ring onto one of the layers of the cylinder head gasket or by punching raised sections into one or more layers of the cylinder head gasket.

Moreover, it is known from DE 195 13 361 C1, for example, to provide a support layer of the cylinder head gasket, which is adjacent to the beaded function layer made of spring steel and which is formed from a different material with lower tensile strength and higher percentage elongation after fracture, with an edging fold running along the edge of the combustion chamber hole.

SUMMARY OF THE INVENTION

The object forming the basis of the present invention is to provide a flat gasket of the aforementioned type with a novel structure.

This object is achieved according to the invention with a flat gasket with the feature of the preamble of Claim 1 in that the gasket sheet made of the spring steel or the metallic material with a percentage elongation after fracture corresponding to the percentage elongation after fracture of a spring steel is provided with at least one edging fold, which comprises a bending region and a flange region connected in one piece to the gasket sheet via the bending region.

Therefore, the concept forming the basis of the present invention is to form an edging fold on the gasket sheet made of spring steel or of a metallic material with a corresponding percentage elongation after fracture itself, so that it is not necessary to provide an additional support layer made of a different material with a higher percentage elongation after fracture in order to form such an edging fold.

In this way, the number of sheet metal layers required for construction of the flat gasket is reduced. As a result of this, the consumption of material is reduced and additional separate working steps are unnecessary.

In this description and in the attached claims, the percentage elongation after fracture of a metallic material should always be understood to mean the percentage elongation after fracture ($A_{80mm}$) in the case of an original gauge length of 80 mm in accordance with DIN EN 10 002, Part 1, i.e. the permanent elongation of the gauge length after fracture ($L_u$-$L_0$) calculated on the basis of the original gauge length ($L_0$) with an original gauge length ($L_0$) of 80 mm, given as a percentage. In this case, $L_u$ denotes the gauge length after fracture of the test piece in the tensile stress test.

The percentage elongation after fracture ($A_{80mm}$) with an original gauge length of 80 mm of the metallic material of the gasket sheet preferably lies in the range of approximately 5% to approximately 22%.

In addition, the tensile strength of the metallic material of the gasket sheet preferably lies at at least approximately 1350 N/mm$^2$.

In this case, the tensile strength should be understood to mean the tensile strength $R_m$ defined in DIN EN 10 002, Part 1, i.e. the stress corresponding to the maximum tensile force ($F_m$) in the tensile stress test.

The maximum tensile force $F_m$ is the highest force that the test piece has withstood during the course of the tensile stress test after the yield point has been exceeded.

The gasket sheet made of the spring steel or the spring steel-like metallic material provided with the edging fold can in particular have a hole, in which case the edging fold extends at least along one section of the periphery of the hole.

In particular, it can be provided that the edging fold extends at least partially around a combustion chamber hole of the gasket sheet.

In a preferred configuration of the invention, it is provided that the edging fold extends around the entire periphery of the hole.

The flat gasket according to the invention can in particular have a vertically deformable bead extending around the hole.

It is particularly favourable if the edging fold forms a deformation restriction means, which restricts the vertical deformation of the bead extending around the hole. Thus, in this case the edging fold serves as "stopper", which prevents the bead from being pressed on block when in supported state, as a result of which a substantial increase in the life of the bead, and thus in the service life of the flat gasket, is achieved.

In this configuration of the invention, the deformation restriction means for the bead may be produced particularly simply and with low material use, since no additional sheet metal layers are necessary for the deformation restriction means.

Since the gasket sheet is formed from a spring steel material or a spring steel-like material, which has good elastic properties, it can be provided in particular that the bead is configured on the same gasket sheet that is also provided with the edging fold.

In a particular configuration of the flat gasket according to the invention it can be provided that, in addition to the edging fold, which is arranged as inner deformation restriction means on the side of the bead facing the hole, the flat gasket comprises an outer deformation restriction means, which is arranged on the side of the bead remote from the hole.

The structure of the flat gasket is particularly simple if this outer deformation restriction means is arranged on the same gasket sheet that is also provided with the edging fold.

In a preferred configuration of the flat gasket it can be provided that the outer deformation restriction means comprises at least one deformation restriction element, which is formed by separating a region of a gasket sheet along a separating line and subsequently bending this region out of the plane of this gasket sheet.

It is preferably provided that the flange region is folded over onto the gasket sheet itself.

In particular it can be provided that the flange region lies substantially flat on the main surface of the gasket sheet facing the flange region.

Since the metallic material used for the gasket sheet has a low percentage elongation after fracture, only edging folds with relatively narrow flange regions, i.e. with flange regions, which only have a small extent vertical to the bending line, can be produced without any special additional measures, since during folding over very high peripheral stresses occur on the outer edge of the flange region.

To be able to generate flange regions of any desired width, it is advantageously provided that the edging fold has several incisions, which extend out from an outer edge of the flange region remote from the bending region towards the bending region.

The incisions widen out at their outer end facing the outer edge of the flange region during folding over of the flange region, so that no, or only low, peripheral stresses occur and thus flange regions of any desired width can be produced.

In a preferred configuration of the flat gasket it is provided that the average length of the incision-free regions of the outer edge of the flange region between the incisions arranged consecutively in the longitudinal direction of the edging fold is greater than the average extent of the incisions in the longitudinal direction of the edging fold at the outer edge of the flange region.

It is particularly favourable if the average length of the incision-free regions of the outer edge of the flange region between the incisions arranged consecutively in the longitudinal direction of the edging fold is at least double the average extent of the incisions in the longitudinal direction of the edging fold at the outer edge of the flange region.

A particularly large reduction in the peripheral stresses is achieved during folding over, if at least one of the incisions extends out from the outer edge of the flange region into the bending region of the edging fold.

In particular, it can be provided that the bending region has an inner edge remote from the flange region of the edging fold, and that at least one of the incisions extends out from the outer edge of the flange region and beyond the inner edge of the bending region.

If the edging fold extends at least in sections around a hole with a centre point, then the angular distance relative to the centre point of the hole of consecutive incisions in the peripheral direction of the hole in particular amounts to approximately 1° to approximately 20°, preferably 2° to approximately 15°.

The edging fold can be formed by generating the incisions in an edge region of a hole of the gasket sheet and subsequently folding over the edge region.

The incisions can be produced, for example, by mechanical cutting, punching or by laser cutting.

In a preferred configuration it is provided that the incisions are produced by cutting into the gasket sheet in a manner substantially without material loss. In this case, the lateral edges of the incisions run substantially parallel to one another before folding over.

In a preferred configuration of the flat gasket it is additionally provided that the flat gasket is multilayered.

In particular, besides the gasket sheet, which is provided with the edging fold, the flat gasket can additionally comprise at least one further gasket sheet made of a spring steel or a metallic material with a percentage elongation after fracture corresponding to the percentage elongation after fracture of a spring steel.

Moreover, it can be provided that, besides the gasket sheet, which is provided with the edging fold, the flat gasket can additionally comprise at least one further gasket sheet, which is provided with at least one bead extending around a hole.

In particular it can be provided that, besides the gasket sheet, which is provided with the edging fold, the flat gasket additionally comprises at least two further gasket sheets, between which the gasket sheet provided with the edging fold is arranged.

In a further configuration of the invention it is provided that, besides the gasket sheet, which is provided with the edging fold, the flat gasket additionally comprises at least one support sheet with an angled section. The support sheet can be formed in particular from a metallic material with a higher percentage elongation after fracture and/or a lower tensile strength than spring steel.

In particular it can be provided that the edging fold and the angled section extend around a hole, and that the gasket sheet, which is provided with the edging fold, projects towards the centre point of the hole and over the support sheet, which is provided with the angled section.

In order to reduce the height, which is effective for restricting the bead deformation, of the flange region of the edging fold, which has a thickness of approximately 0.20 mm to 0.25 mm, for example, another sheet of the flat gasket can be partially reduced in thickness, e.g. by stamping.

In particular, it can be provided that an angled region of a support sheet provided with an angled section extends around a hole and comprises an inner section facing the hole and an outer section facing away from the hole, wherein the inner section has a smaller thickness than the outer section.

Alternatively or additionally hereto, it can be provided that, besides the gasket sheet, which is provided with the edging fold, the flat gasket comprises at least one further gasket sheet, which has a reduced thickness in the region corresponding to the position of the flange region of the edging fold.

To microseal machining score marks on the gasket sheets or the roughness of the rolling surfaces of the metal sheets, from which the gasket sheets are produced, the gasket sheets are preferably provided completely or in sections, on one or both sides, with an elastomer coating.

The further object forming the basis of the invention is to provide a novel process for the production of a flat gasket, in particular a cylinder head gasket, which comprises at least one metal gasket sheet made of a spring steel or a metallic material with a percentage elongation after fracture corresponding to the percentage elongation after fracture of a spring steel.

This object is achieved according to the invention by a process, which comprises the following process steps:

folding at least one region of the metal gasket sheet over to form a flange region of an edging fold folded over onto the gasket sheet, said edging fold being connected in one piece to the gasket sheet via a bending region of the edging fold.

There are special configurations of this process, the advantages of which have already been outlined above in association with the flat gasket according to the invention.

Further features and advantages of the invention are the subject of the following description and the drawing showing embodiments:

BRIEF DESCRIPTION OF THE DRAWINGS

Identical or functionally equivalent elements are given the same reference numerals in all figures.

DETAILED DESCRIPTION OF THE INVENTION

Figure 1:
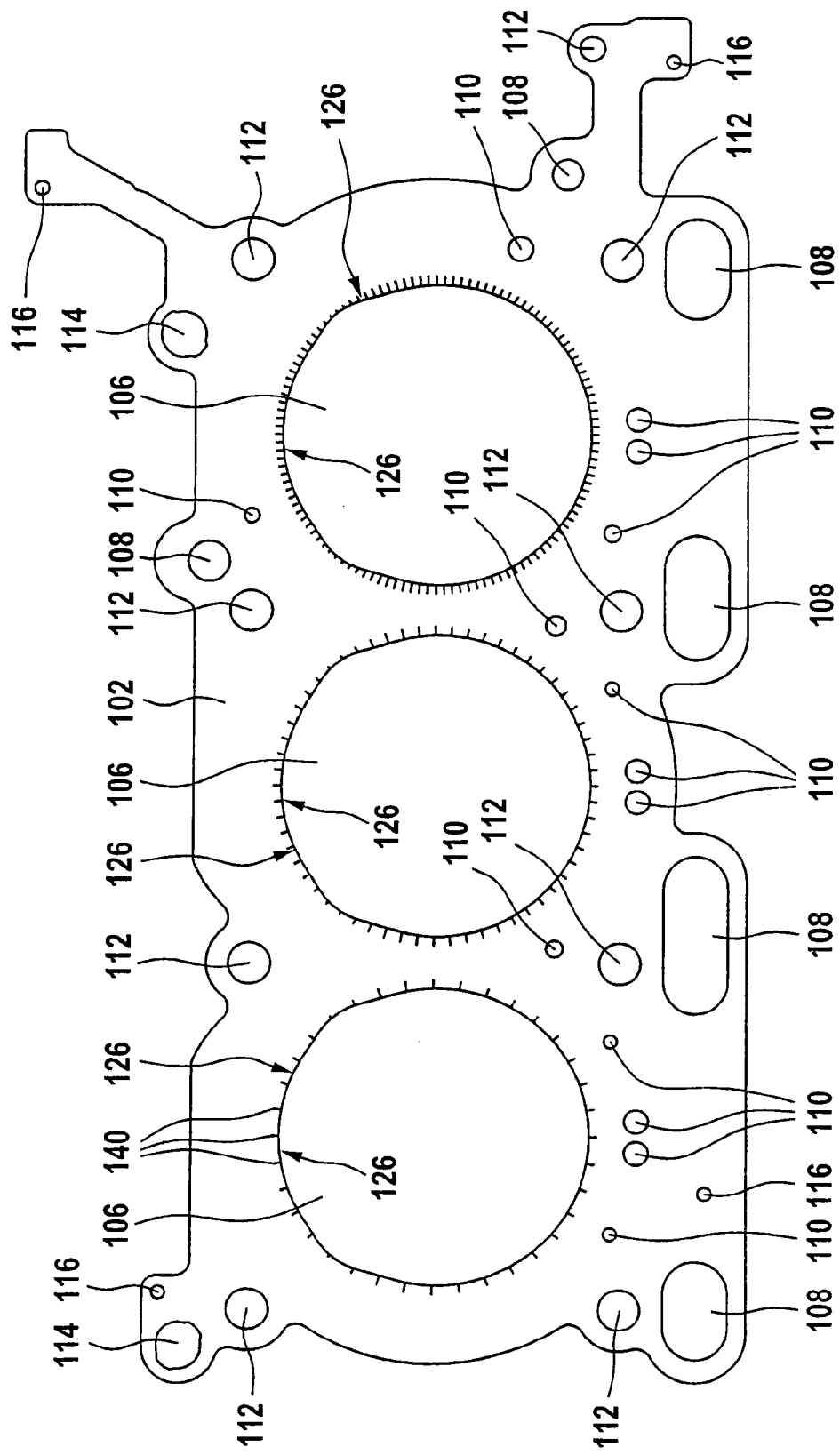
FIG. 1 is a schematic plan view onto a metal gasket sheet of a cylinder head gasket, wherein the gasket sheet has combustion chamber holes, the edge regions of which are provided with incisions.

A first embodiment of a cylinder head gasket given the overall reference 100 shown in FIGS. 9 and 1 to 6 comprises a first metal gasket sheet 102 and a second metal gasket sheet 104, which are both respectively provided with flush combustion chamber holes 106, oil duct holes 108, water channel holes 110, fastening bolt holes 112, close-tolerance bolt holes 114 and rivet holes 116.

The first metal gasket sheet 102 is produced from an elastic spring steel sheet, e.g. from a sheet of the spring steel with the material number 1.4310 (DIN 17440 or EN 10088-3).

The spring steel with the material number 1.4310 has the following chemical composition: 0.05-0.15% by weight C; maximum 2.00% by weight Si; maximum 2.00% by weight Mn; maximum 0.045% by weight P; maximum 0.015% by weight S; 16.00-19.00% by weight Cr; maximum 0.80% by weight Mo; 6.00-9.50% by weight Ni; maximum 0.11% by weight N; remainder Fe.

The material of the first metal gasket sheet preferably has a tensile strength of at least 1350 N/mm$^2$ and a percentage elongation after fracture ($A_{80mm}$) with an original gauge length of 80 mm of approximately 5% to approximately 22%.

The second metal gasket sheet 104 can be produced from the same material as the first metal gasket sheet 102.

Each of the gasket sheets 102, 104 is respectively provided with at least one bead 118 or 118', which extends respectively around one of the combustion chamber holes 106. It can also be provided that each of the gasket sheets 102, 104 is only respectively provided with one bead 118 or 118', which extends around all the combustion chamber holes 106 of the respective gasket sheet 102, 104.

The facing arches of the beads 118 of the gasket sheets 102 and 104 respectively form a sealing line 120 of the respective gasket sheet 102, 104.

The beads 118 surrounding the combustion chamber holes 106 are elastically vertically deformable.

In order to prevent damage to the beads 118 as a result of the sealing gap variations occurring during operation of the internal-combustion engine, the cylinder head gasket 100 comprises a deformation restriction means 122, which is configured as an edging fold 124 configured on the first metal gasket sheet 102.

Figure 5:
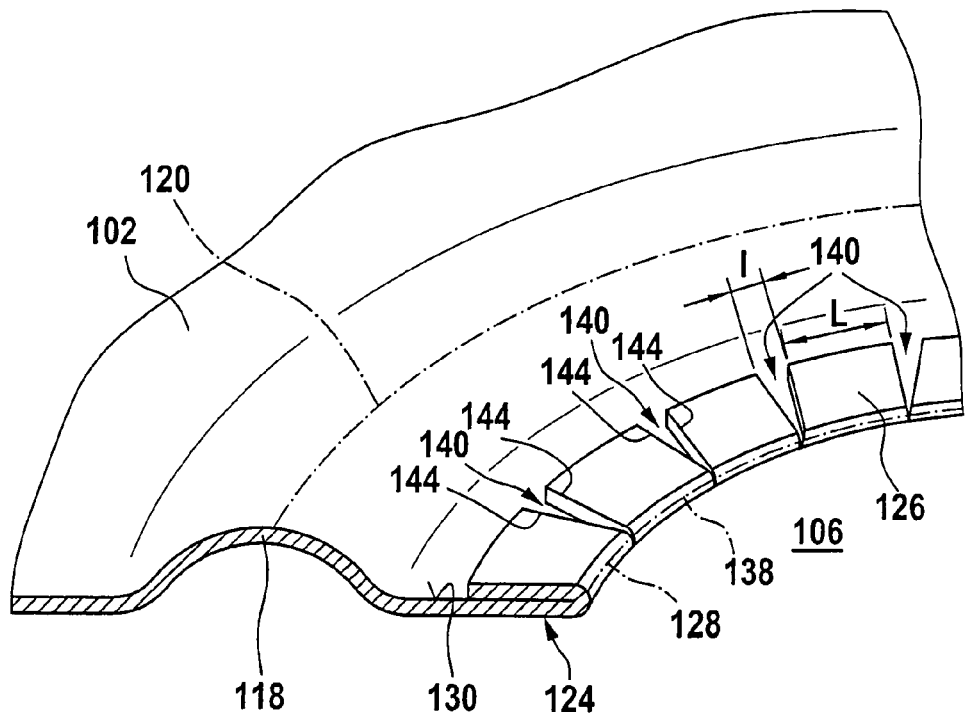
FIG. 5 is a schematic perspective representation in partial section of a crimped metal gasket sheet with an edging fold, which is provided with incisions, which extend from the outer edge of the edging fold into the bending region of the edging fold.
Figure 6:
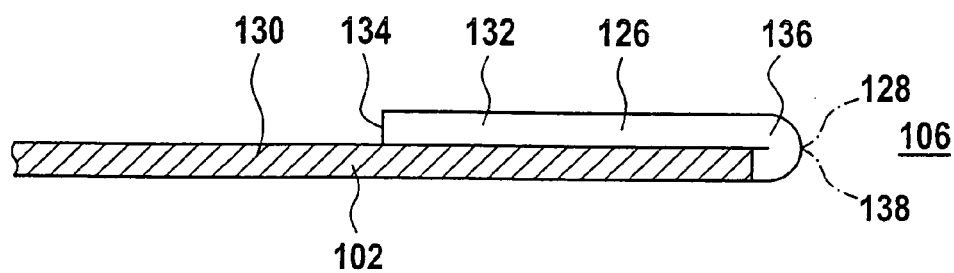
FIG. 6 is a schematic sectional view through the gasket sheet from FIG. 5 in the region of one of the incisions of the edging fold.

As may best be seen from FIGS. 5 and 6, the edging fold 124 is arranged between the bead 118 of the first metal gasket sheet 102 and a respective combustion chamber hole 106 and formed by the edge region 126 of the respective combustion chamber hole 106 being bent around a substantially circular ring-shaped bending line 128 out of the plane of the gasket sheet 102 and folded over onto the upper main surface 130 of the gasket sheet 102.

As may best be seen from FIGS. 5 and 6, the edging fold 124 thus comprises a flange region 132 with an outer edge 134, which is remote from the combustion chamber hole 106 and connected in one piece with the gasket sheet 102 via a bending region 136 bent substantially in a U shape.

The bending line 128 forms a central inner edge 138 of the bending region 136 in the finished state of the gasket sheet 102.

In the fully folded over state, the flange region 132 of the edging fold 124 lies with its underside facing the gasket sheet 102 substantially over its full surface on the upper main surface 130 of the gasket sheet 102.

The flange region 132 therefore increases the thickness of the first gasket sheet 102 in the region of the edging fold 124, so that the beads 118 of the gasket sheets 102, 104 can no longer be deformed on block and thus cannot be damaged.

Since the spring steel sheet used for the first gasket sheet 102 has only a low percentage elongation after fracture, only edging folds 124 with narrow flange regions 132, i.e. with flange regions 132, which only have a small extent vertically to the bending line 128, can be produced without any special additional measures, since very high peripheral stresses occur when folding over the edge region 126 of the combustion chamber hole 106 to the outside.

To be able to produce edging folds 124 with flange regions 132 of any desired width, a plurality of incisions 140, which extend radially out from the edge of the combustion chamber hole 106 and are arranged consecutively substantially equidistant from one another in the peripheral direction of the combustion chamber hole 106, is produced in the edge region 126 of the respective combustion chamber hole 106 before folding over the edge region 126.

The angular distances in the peripheral direction of the combustion chamber hole 106 of consecutive incisions 140 preferably lie between approximately 1° and approximately 20°.

Figure 2:
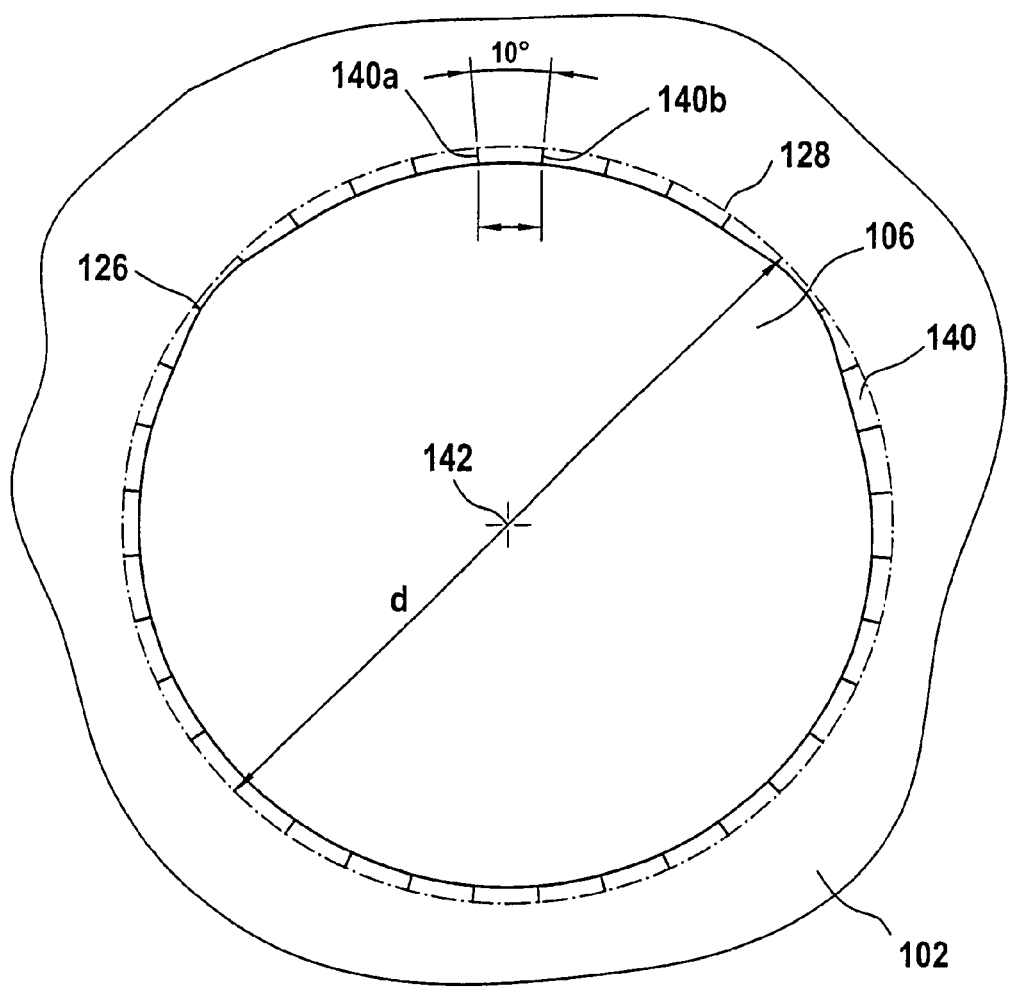
FIG. 2 is an enlarged representation of the combustion chamber hole shown on the left in FIG. 1.

In the embodiment shown in FIG. 2, the angular distance between consecutive incisions 140, relative to the centre point 142 of the combustion chamber hole 106, respectively amounts to 10°. In this case, the angular distance is measured between mutually corresponding elements of the incisions 140, i.e. between the left edge of the first incision 140a and the corresponding left edge of the second incision 140b, for example.

Figure 3:
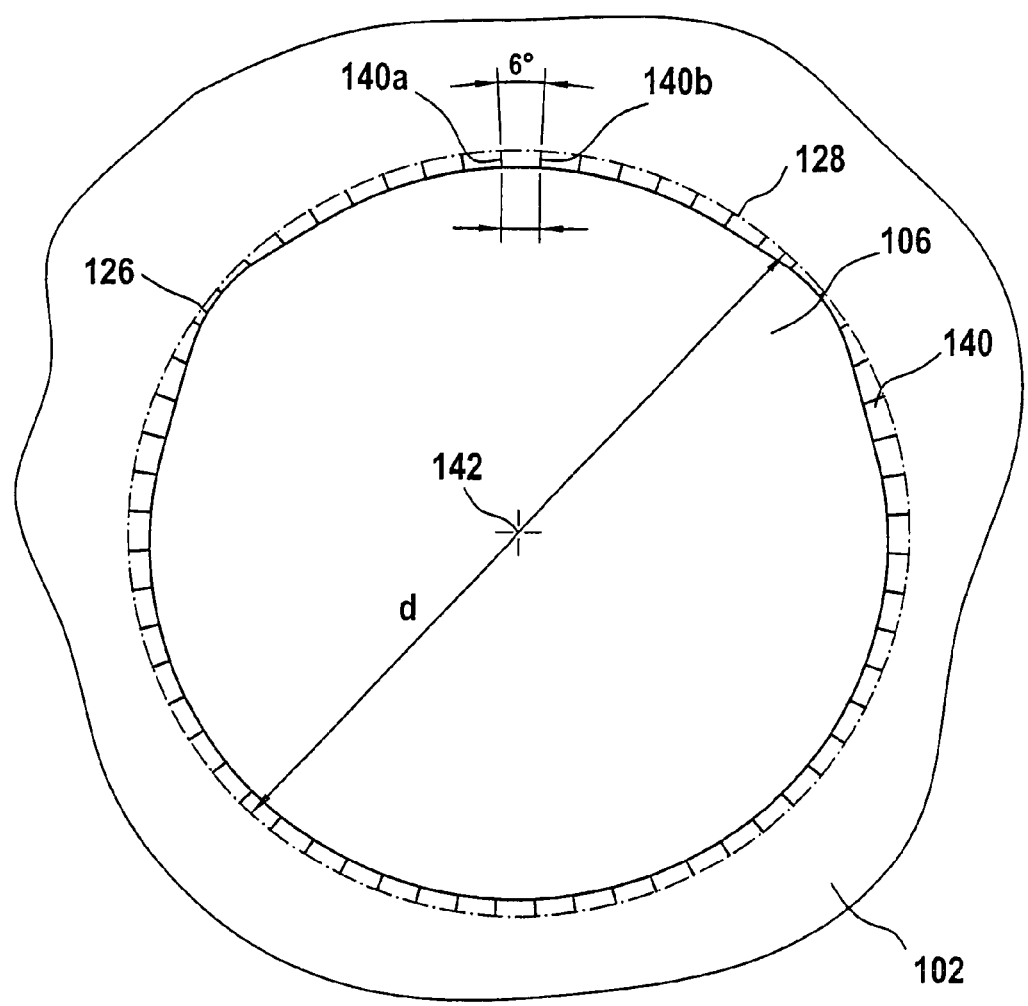
FIG. 3 is an enlarged representation of the combustion chamber hole shown in the centre in FIG. 1.
Figure 4:
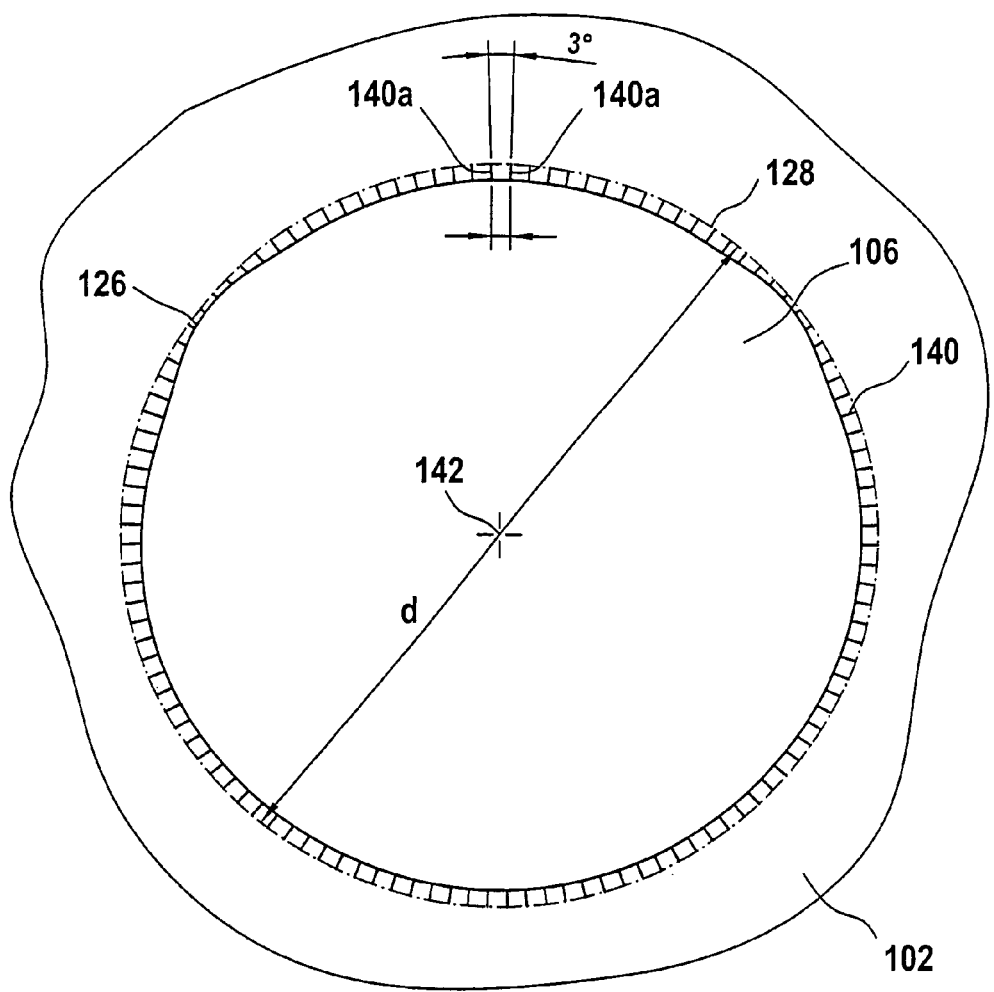
FIG. 4 is an enlarged representation of the combustion chamber hole shown on the right in FIG. 1.

In the embodiment shown in FIG. 3, the angular distance between incisions 140 arranged consecutively in the peripheral direction of the combustion chamber hole 106 respectively amounts to 6°, and in the embodiment shown in FIG. 4 the angular distance between incisions 140 arranged consecutively in the peripheral direction of the combustion chamber hole 106 respectively amounts to 3°.

In the case of the gasket sheet 104 shown in FIG. 1, which is shown in its state before the edge regions 126 of the combustion chamber hole 106 are folded over, the angular distances of the incisions 140 differ from one another at each of the three combustion chamber holes 106. However, this representation only serves for illustration purposes. Generally, the incisions 140 at the edge regions 126 of all the combustion chamber holes 106 of the same gasket sheet 102 are respectively at substantially the same angular distance from one another.

The angular distances of the incisions 140 arranged consecutively along a combustion chamber hole 106 can also vary along the periphery of the same combustion chamber hole.

The incisions 140 are produced by cutting using a mechanical cutting tool, by punching out using a mechanical punching tool or by laser cutting using a laser beam.

The incisions 140 are preferably produced in the edge regions 126 of the combustion chamber hole 106 in a manner substantially without material loss.

The lateral edges 144 of the incisions 140 running in radial direction are oriented substantially parallel to one another before the edge regions 126 are folded over. These lateral edges 144 only taper towards one another in a wedge shape after the edge regions 126 are folded over, as shown in FIG. 5.

After the folding over, the average length L of the incision-free regions of the outer edge 134 of the flange region 132 between the incisions 140 arranged consecutively in the longitudinal direction of the edging fold 124 is larger than, preferably at least double, the average extent I of the incisions 140 in the longitudinal direction of the edging fold 124 on the outer edge of the flange region 132.

As may best be seen from FIGS. 2 to 4, before the edge of the respective combustion chamber hole 106 is folded over, the incisions 140 extend outwards as far as the bending line 128, which is configured to be substantially circular with the diameter d, or extend slightly beyond this.

The consequence of this is that the incisions 140 on the finished gasket sheet 102, as is shown in FIGS. 5 and 6, extend from the outer edge 134 of the flange region 132 of the edging fold 124 radially inwards and beyond the bending line 128 or beyond the inner edge 138 of the bending region 136 into the bending region 136 of the edging fold 124.

A particularly large reduction in peripheral stresses is achieved in this way during folding over of the edge regions 126. As may be seen from FIGS. 2 to 4, before folding over, the edge regions 126 of the combustion chamber holes 106 can be configured so that their edges do not run in a circular shape and concentrically to the bending line 128, but are at a distance from the bending line 128 that varies in the peripheral direction of the combustion chamber hole 106.

However, since all the incisions 140 extend from the edge of the combustion chamber hole 106 to the bending line 128 or extend slightly beyond this, the incisions 140 thus have different radial extents in this case.

The procedure for the production of the first embodiment of a cylinder head gasket 100 shown in FIGS. 9 and 1 to 6 is are follows:

The holes 106, 108, 110, 112, 114 and 116 are firstly punched out from a spring steel sheet in a progressive die. The incisions 140 are then produced at the edge regions 126 of the combustion chamber holes 106 by punching, mechanical cutting and/or laser cutting.

The edge regions 126 of the combustion chamber holes 106 are then raised from the main plane of the gasket sheet 102 by means of suitable tools and then folded over onto the upper main surface 130 of the gasket sheet 102, so that the edging fold 124 shown in FIGS. 5 and 6 is produced.

The beads 118 extending around the combustion chamber holes 106 can be stamped into the gasket sheet 102 before or after the folding process.

Figure 9:
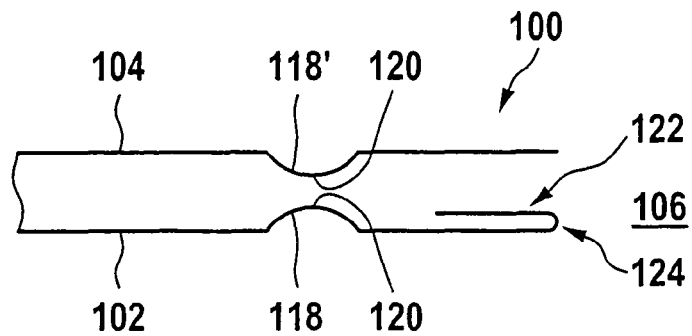
FIG. 9 shows a section from a schematic sectional view through a double-layered flat gasket, wherein a layer of the flat gasket is provided with a bead and with an edging fold and the second layer of the flat gasket is provided with a bead.

The first gasket sheet 102 is then connected to the separately produced second gasket sheet 104, e.g. by means of rivets extending through the rivet holes 116, to form the double-layered cylinder head gasket 100 shown in FIG. 9.

Figure 7:
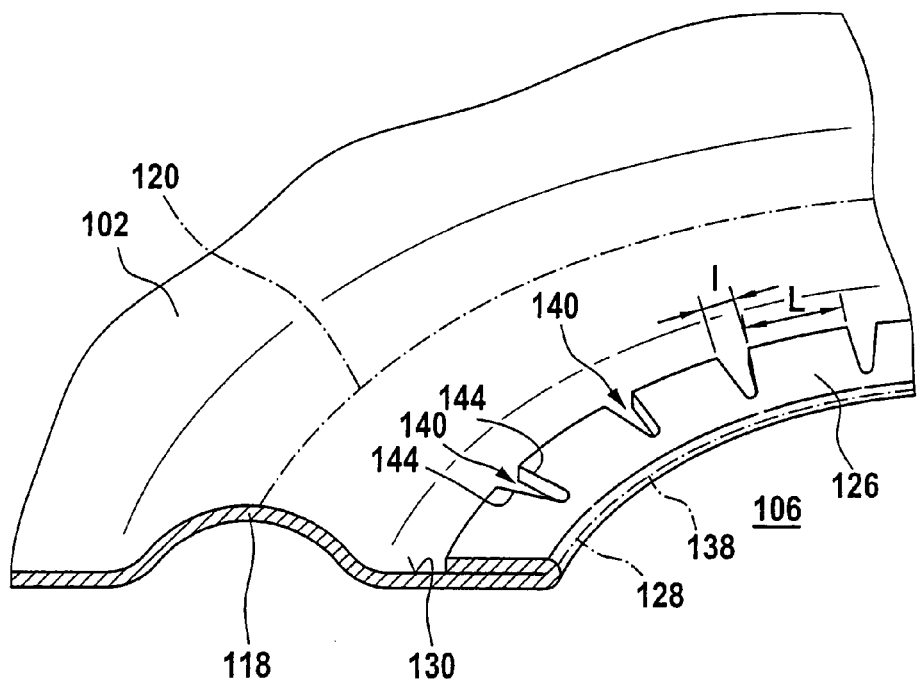
FIG. 7 is a schematic perspective representation in partial section of a beaded metal gasket sheet with an edging fold, which is provided with incisions, which extend from the outer edge of the edging fold towards the bending region of the edging fold.
Figure 8:
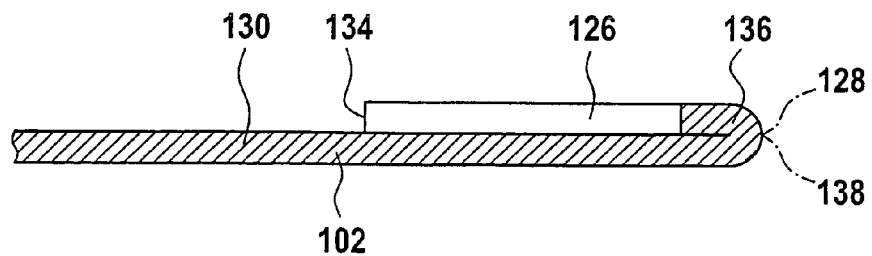
FIG. 8 is a schematic sectional view through the gasket sheet from FIG. 7 in the region of one of the incisions of the edging fold.

A second embodiment of a cylinder head gasket 100 shown in FIGS. 7 and 8 differs from the above-described first embodiment in that the incisions 140 of the edging fold 124 do not extend out from the outer edge 134 of the flange region 132 into the bending region 136 of the edging fold 124, but terminate radially outside the bending region 136.

This is achieved as a result of the edge region 126 of the combustion chamber hole 106 not being cut in as far as the bending line 128 before folding over, instead the incisions 140 terminate radially inside the bending line 128.

This embodiment is suitable in particular for those application cases, in which the width of the flange region 132, i.e. its extent vertical to the bending line 128, is comparatively small and/or the metallic material of the gasket sheet 102 has a relatively high percentage elongation after fracture.

Otherwise, the second embodiment of a cylinder head gasket 100 shown in FIGS. 7 and 8 is the same with respect to its structure, function and method of production as the first embodiment shown in FIGS. 9 and 1 to 6, and reference is made to the above description of the latter in this regard.

Figure 10:
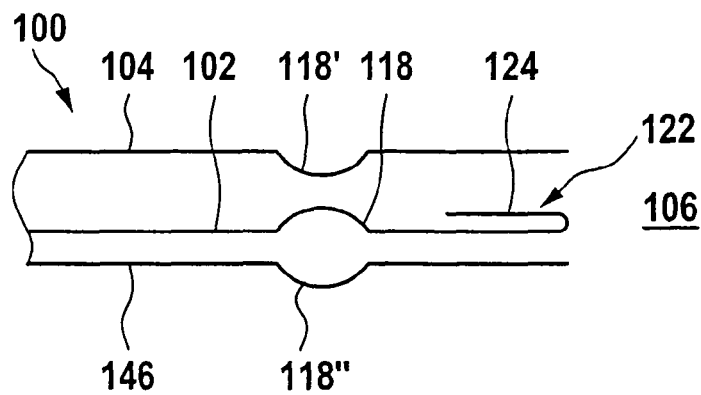
FIG. 10 shows a section from a schematic sectional view through a triple-layered flat gasket, wherein two outer layers of the gasket are provided with a bead and a middle layer of the gasket is provided with a bead and with an edging fold.

A third embodiment of a cylinder head gasket 100 shown in FIG. 10 differs from the first embodiment shown in FIG. 9 merely in that in addition to the first metal gasket sheet 102, which around each combustion chamber hole 106 is respectively provided with a bead 118 and an edging fold 124, and to the second metal gasket sheet 104, which around each combustion chamber hole 106 is respectively provided with a bead 118', the arch of which faces the arch of the bead 118, said cylinder head gasket comprises a third metal gasket sheet 146, which has holes flush with the holes in the first two gasket sheets 102, 104 and around each combustion chamber hole 106 is provided with a bead 118'', the arch of which faces away from the arch of the bead 118 of the first metal gasket sheet 102, wherein the first metal gasket sheet 102 is arranged with the edging fold 124 between the two further metal gasket sheets 104 and 146.

Otherwise, the third embodiment of a cylinder head gasket 100 shown in FIG. 10 is the same with respect to its structure, function and method of production as the first embodiment shown in FIG. 9, and reference is made to the above description of the latter in this regard.

Figure 11:
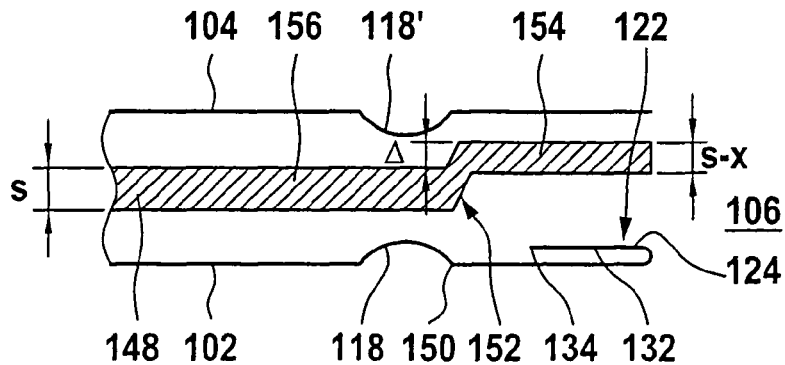
FIG. 11 shows a section from a schematic sectional view through a triple-layered flat gasket, wherein an outer layer of the flat gasket is provided with a bead, a further outer layer of the flat gasket is provided with a bead and with an edging fold and a middle support layer of the gasket is provided with an angled section.

A fourth embodiment of a cylinder head gasket 100 shown in FIG. 11 differs from the first embodiment shown in FIG. 9 in that in addition to the first metal gasket sheet 102 with the bead 118 and the edging fold 124 and to the second metal gasket sheet 104 with the bead 118', the cylinder head gasket 100 comprises a metal support sheet 148, which is arranged between the metal gasket sheets 102 and 104 and which is provided with an angled section 152 with height Δ at a location lying closer to the combustion chamber hole 106 than the bead foot 150 of the bead 118 facing the combustion chamber hole 106 of the first gasket sheet 102 and lying further away from the combustion chamber hole 106 than the outer edge 134 of the flange region 132 of the edging fold 124 of the first gasket sheet 102.

The angled region 154 of the support sheet 148, which is angled towards the second gasket sheet 104 by the amount Δ and is located radially inside the angled section 152, can have a width in this case, which is reduced in relation to the thickness s of the region 156 of the support sheet 148 located radially outside the angled section 152 by stamping to the reduced thickness s–x.

This reduction in thickness of the angled region 154 of the support sheet 148 serves to reduce the effective stopper thickness of the flange region 132 of the edging fold 124 from the thickness t of the spring steel sheet used (in the range of preferably 0.20 mm to approximately 0.25 mm) to a desired effective stopper thickness.

In order to achieve the same effective stopper thickness for the beads 118 and 118', it is preferably provided that the height Δ of the angled section corresponds approximately to half the difference (t–x).

The support sheet 148 is preferably produced from a metallic material, which has a relatively low tensile strength (preferably a tensile strength of approximately 400 N/mm² at maximum) and a higher percentage elongation after fracture ($A_{80mm}$) with an original gauge length of 80 mm (preferably at least 24%) than the metallic material of the first gasket sheet 104.

Otherwise, the fourth embodiment of a cylinder head gasket 100 shown in FIG. 11 is the same with respect to its structure, function and method of production as the first embodiment shown in FIG. 9, and reference is made to the above description of the latter in this regard.

Figure 12:
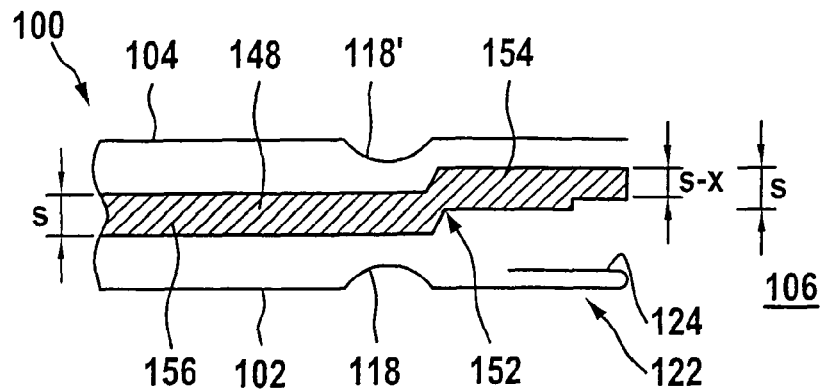
FIG. 12 shows a section from a schematic sectional view through a triple-layered flat gasket, wherein an outer layer of the flat gasket is provided with a bead, a further outer layer of the flat gasket is provided with a bead and with an edging fold and a middle support layer of the gasket is provided with an angled section and with an edge region with reduced thickness.

A fifth embodiment of a cylinder head gasket 100 shown in FIG. 12 differs from the fourth embodiment shown in FIG. 11 in that the angled region 154 of the support sheet 148 has an inner section 158 facing the combustion chamber hole 106 with the thickness s–x reduced by stamping and an outer section 160 located between the inner section 158 and the angled section 152 and having the thickness s, which corresponds to the thickness s of the external region 156 of the support sheet 148 located outside the angled section 152.

Otherwise, the fifth embodiment of a cylinder head gasket 100 shown in FIG. 12 is the same with respect to its structure, function and method of production as the fourth embodiment shown in FIG. 11, and reference is made to the above description of the latter in this regard.

Figure 13:
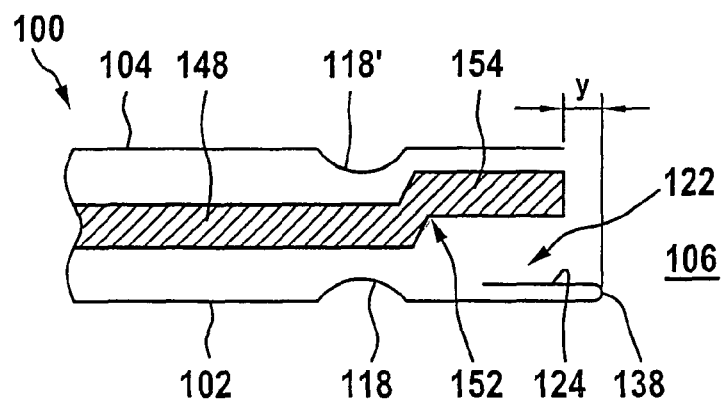
FIG. 13 shows a section from a schematic sectional view through a triple-layered flat gasket, wherein an outer layer of the flat gasket is provided with a bead, a further outer layer of the flat gasket is provided with a bead and with an edging fold and a middle support layer of the gasket is provided with an angled section, wherein the gasket layer provided with the edging fold projects beyond the support layer to the centre of a hole of the flat gasket.

A sixth embodiment of a cylinder head gasket 100 shown in FIG. 13 differs from the fourth embodiment shown in FIG. 11 in that the edging fold 124 of the first gasket sheet 102 projects towards the centre point 142 of the combustion chamber hole 106 to the distance y and beyond the inner edge of the support sheet 148 and beyond the inner edge of the second metal gasket sheet 104.

Otherwise, the sixth embodiment of a cylinder head gasket 100 shown in FIG. 13 is the same with respect to its structure, function and method of production as the fourth embodiment shown in FIG. 11, and reference is made to the above description of the latter in this regard.

Figure 14:
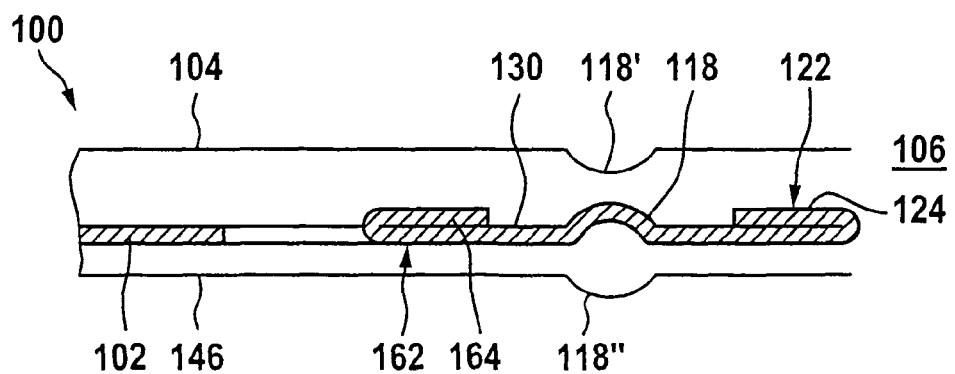
FIG. 14 shows a section from a schematic sectional view through a triple-layered flat gasket, wherein two outer layers of the flat gasket are each provided with a bead and a middle layer of the flat gasket is provided with a bead, an edging fold and an outer bead deformation restriction means with a deformation restriction element cut out of the gasket layer and bent over onto the gasket layer.

A seventh embodiment of a cylinder head gasket 100 shown in FIG. 14 differs from the third embodiment shown in FIG. 10 in that besides the inner deformation restriction means 122 in the form of the edging fold 124 arranged radially inside the bead 118, the first metal gasket sheet 102 is additionally provided with an outer deformation restriction means 162, which is arranged radially outside the bead 118 and which comprises several deformation restriction elements 164 arranged consecutively in the peripheral direction of the combustion chamber hole 106 and formed by separating a respective region of the metal gasket sheet 102 and subsequently folding this region over onto the upper main surface 130 of the metal gasket sheet 102.

Outer deformation restriction means 162 of this type are known, for example, from DE 102 13 900 A1, and reference is made to this in this regard and the respective content thereof incorporated into this application.

Otherwise, the seventh embodiment of a cylinder head gasket 100 shown in FIG. 14 is the same with respect to its structure, function and method of production as the third embodiment shown in FIG. 10, and reference is made to the above description of the latter in this regard.

The invention claimed is:
1. Process for the production of a flat gasket, in particular a cylinder head gasket, which comprises at least one metal gasket sheet made of a spring steel or a metallic material with a percentage elongation after fracture corresponding to the percentage elongation after fracture of a spring steel, comprising the following process steps:
generating a plurality of incisions in the gasket sheet;
subsequently folding the region located between the incisions over to form a flange region of an edging fold folded over onto the gasket sheet and connected in one piece to the gasket sheet via a bending region of the edging fold;

wherein the incisions are produced such that, after folding has occurred, the average length of the incision-free regions of the outer edge of the flange region of the edging fold between the incisions arranged consecutively in the longitudinal direction of the edging fold is greater than the average extent of the incisions in the longitudinal direction of the edging fold at the outer edge of the flange region.

2. Process according to claim 1, wherein the incisions are produced by mechanically cutting or laser cutting into the gasket sheet or by punching out the gasket sheet.

3. Process according to claim 1, wherein the incisions are produced by cutting into the gasket sheet in a manner substantially without material loss.

* * * * *